Figure 1:
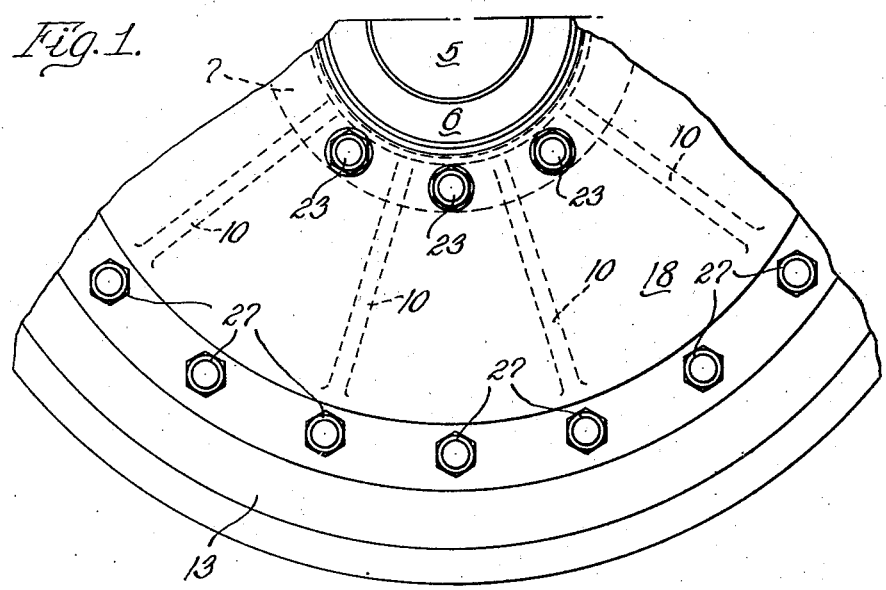

March 25, 1947.  A. O. WILLIAMS  2,418,002

WHEEL

Filed May 18, 1945

INVENTOR.
Alfred O. Williams
BY Walter E. Schismer
Atty.

Patented Mar. 25, 1947

2,418,002

UNITED STATES PATENT OFFICE 2,418,002

WHEEL

Alfred O. Williams, Battle Creek, Mich., assignor to Clark Equipment Company, Buchanan, Mich., a corporation of Michigan Application May 18, 1945, Serial No. 594,528

4 Claims. (Cl. 295—11)

This invention relates to wheels, and is particularly directed to rail wheels of the type used on streetcars, rapid transit trains, subway trains, and the like where a quiet operating wheel is desired of simplied construction to eliminate transmission of noises from the wheel into the truck frame, and to provide for cushioning of the tread portion of the wheel relative the wheel body.

The present construction is intended to provide a simplified type of wheel in which the rim portion of the wheel is provided with a radially inwardly extending web or flange disposed between adjacent radially extending hub plates carried by the hub, there being interposed between opposite faces of the hub and the adjacent faces of the hub plates resilient members providing a non-metallic cushioning mechanism between the rim and the body of the wheel.

In previous designs, such resilient members have been of rather special and elaborate design, providing for metallic side plates bonded or vulcanized to the side faces of each of the rubber discs, which plates have had means formed thereon for locking them in position against radial displacement, such as by extrusion of the plate into openings in the hub plates or by radial extension of the plates and clamping them to the wheel studs or riveting them to the web of the flange of the rim. The present invention is intended to eliminate the necessity of such complicated structures and to provide for maintaining the rubber disc elements in positon entirely by compression. In this connection, the disc members are provided with no side plates whatever, but are directly engaged on the faces of the web and the hub plates and are held in engaged position by lateral pressure. I have found that with a construction of this type, the resilient action of the wheel is not at all affected, and the rubber apparently provides the same relative cushioning action and does not move out of position. As a result, a wheel of simpler and more economical design is provided, and one which may be assembled more easily.

Other objects and advantages of the present invention will be more apparent from the following detailed description, which, taken in conjunction with the accompanying drawing, will describe to those skilled in the art the particular construction and operation of a preferred form of the present invention.

Figure 2:
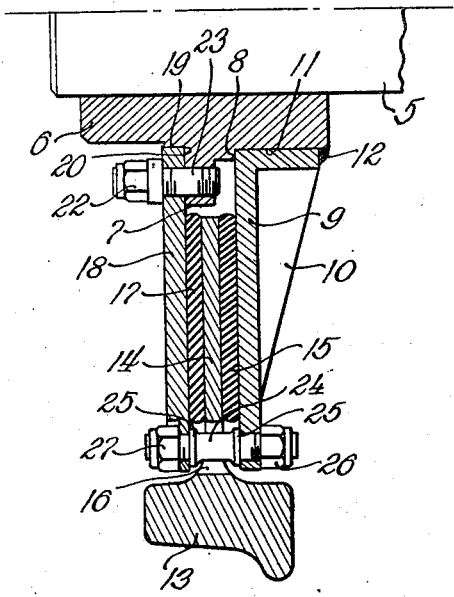

In the drawing:

Figure 1 is an elevational view of a portion of the wheel embodying the present invention; and Figure 2 is a sectional view through a portion of the wheel shown in Figure 1, illustrating in detail the assembly of the cushioning elements with respect to the wheel parts.

Considering the drawing in detail, an axle shaft is indicated generally at 5 and has mounted thereon a hub member 6 provided with an intermediate radial flange 7. Mounted on one side of the flange 7 up against the radial shoulder 8 is a hub plate member 9 having radially extending reinforcing rib portions 10. This member is forced over the annular surface 11 of the hub member 6 into position against the shoulder 8, and is then welded into position, as indicated at 12.

With the member 9 in position, the rim member 13 having the radially inwardly extending web 14 is adapted for assembly over the end of the axle shaft and about the flange 7, there being interposed between the inner face of the flange 14 and the inner face of the member 9 an annular radial disc member 15 formed of rubber, and of a radial extent substantially equal to that of the flange 14 from the inner end thereof out to the series of circumferentially spaced openings 16 disposed at the inner peripheral surface of the rim member 13. A corresponding annular rubber disc member 17 is provided on the opposite face of the flange 14, and is adapted to be compressed thereagainst by a second hub plate member 18. This member seats on the annular surface 19 of the hub 6 and up against the radial shoulder 20 of the flange 7. At its inner end, the plate 18 is securely held in position by the series of nuts 22 threaded over fixed studs 23 carried in the flange 7.

The plate members 9 and 18 are of substantially the same outer diameter, and are adapted to be apertured around their periphery to receive a series of studs 24 which are provided with axially spaced shoulders 25 forming spacing means to space the outer ends of the plate members 9 and 18 the same distance apart as the shoulders 8 and 20 at the inner ends of these members. The stud 24 has opposite threaded ends extending through corresponding openings in the plate members 9 and 18 and adapted to receive nuts 26 and 27, whereby the outer ends of the plate members 9 and 18 are tightly clamped against the shoulders 25.

This results in uniform axial compression of the resilient discs 15 and 17, and the spacing of the shoulders 8 and 19 and the shoulders 25 is such as to insure sufficient pressure to prevent any radial displacement of the resilient members 15 and 17 relative to the adjacent metal surfaces. As a result, the members 15 and 17 are held firmly in position against radial displacement, and are in uniform compression so that a uniform cushioning action is provided between the load imposed on the axle shaft 5 and the transfer of that load through the members 15 and 17 to the rim 13 of the wheel. At the same time, the members 15 and 17 can act in shear to absorb shock stresses imposed by track joints and the like to provide a quiet running wheel with the desired cushioning action.

It is believed that I have provided a simplified type of resilient wheel which is economic in construction, and which possesses the same inherent characteristics as the more complicated type of wheels heretofore known.

I therefore do not intend to be limited except as defined by the scope and spirit of the appended claims.

I claim:

1. A resilient rail wheel comprising a hub having opposed axially spaced shoulders, radial hub plates seated against said shoulders and spaced thereby, an annular tread member having an inwardly directed flange disposed between said plates, annular radial rubber discs disposed between each of said plates and said flange, and peripherally located studs arranged circumferentially in said plates and having corresponding axially spaced shoulders, said discs being of a normal thickness such that when said hub plates are drawn up tightly against said shoulders said discs are sufficiently compressed axially to retain them in position independently of any locating or anchoring means.

2. The wheel of claim 1 wherein one of said plates is fixed against its hub shoulder and the other of said plates is movable axially up against its hub shoulder, and means for clamping said other plate against its hub shoulder.

3. The wheel of claim 1 wherein said studs have reduced portions intermediate said shoulders, and said flange is provided with enlarged openings receiving said portions of said studs and providing for relative movement therebetween.

4. A rail wheel including a hub having axially spaced radially extending planar hub plates, a tread member having a radially inwardly extending smooth flange intermediate said plates, radial rubber discs between said plates and flange, shouldered stud means about the periphery of said plates for clamping them axially in spaced relation to provide for uniform axial compression of said discs throughout their radial extent, such compression being sufficient to maintain the faces of said discs against displacement relative said plate and flange faces solely by frictional pressure but providing for cushioning action therebetween.

ALFRED O. WILLIAMS.

REFERENCES CITED

The following references are of record in the file of this patent:

UNITED STATES PATENTS

| Number | Name | Date |
|---|---|---|
| 2,220,417 | Malmquist | Nov. 5, 1940 |
| 2,295,270 | Piron | Sept. 8, 1942 |
| 2,392,562 | Williams | Jan. 8, 1946 |